United States Patent [19]

Kazami

[11] Patent Number: 4,571,051
[45] Date of Patent: Feb. 18, 1986

[54] DISPLAY DEVICE OF A CAMERA

[75] Inventor: Kazuyuki Kazami, Tokyo, Japan

[73] Assignee: Nippon Kogaku K.K., Tokyo, Japan

[21] Appl. No.: 697,460

[22] Filed: Feb. 1, 1985

[30] Foreign Application Priority Data

Feb. 6, 1984 [JP] Japan .................................. 59-18479
Feb. 6, 1984 [JP] Japan ............................. 59-14092[U]

[51] Int. Cl.$^4$ ............................................. G03B 17/20
[52] U.S. Cl. .................................... 354/468; 354/469; 354/215
[58] Field of Search ............... 354/465, 468, 469, 471, 354/474, 475, 215, 217, 218, 289.1, 289.12

[56] References Cited

U.S. PATENT DOCUMENTS

| | | | |
|---|---|---|---|
| 3,232,193 | 2/1966 | Stimson | 354/469 X |
| 3,903,530 | 9/1975 | Taguchi et al. | 354/469 |
| 3,975,747 | 8/1976 | Toyoda | 354/469 |
| 4,302,085 | 11/1981 | Kazami et al. | 354/215 X |
| 4,304,475 | 12/1981 | Kitai et al. | 354/468 X |

*Primary Examiner*—William B. Perkey
*Attorney, Agent, or Firm*—Fitzpatrick, Cella, Harper & Scinto

[57] ABSTRACT

A camera having means for measuring the brightness of an object to be photographed and generating a measurement signal corresponding to the measured brightness of the object to be photographed, and means for generating a photographing information signal corresponding to photographing information different from the brightness of the object to be photographed includes display means, means for inputting the measurement signal to the display means, the display means effecting a display in accordance with the measurement signal, the inputting means including change-over means responsive to the generation of the photographing information signal to input the photographing information signal instead of the measurement signal to the display means, and means for clamping the display of the display means within a predetermined range in accordance with the stoppage of the generation of the photographing information signal.

6 Claims, 3 Drawing Figures

DISPLAY DEVICE OF A CAMERA

BACKGROUND OF THE INVENTION

1. Field of the Invention

This invention relates to a display device of a camera.

2. Description of the Prior Art

The operation in which the portion of a film corresponding to a predetermined number of frames which have been exposed or might have been exposed during the loading of the film is wound up and exposed before photographing is actually started is called the fictitious shot. There has been a device for displaying the state of the fictitious shot by a counter or the like.

There has also been known a camera provided with a battery check circuit for detecting whether the power source voltage of the camera is above a level for operating the camera normally and generating a warning when the power source voltage is below that level.

SUMMARY OF THE INVENTION

It is an object of the present invention to provide a display device of a camera for discriminably displaying exposure information and the other photographing information by the use of a single display means.

To achieve the above object, the display device of the camera according to the present invention is designed to effect a display corresponding to the output of a battery check circuit when the battery check circuit detects that the power source voltage of the camera has lowered below a level for operating the camera normally, to display the state of the fictitious shot when the battery check circuit does not detect said fact and the camera is in the fictitious shot state, and to effect an exposure display corresponding to the brightness of an object to be photographed only when the battery check circuit does not detect any drop of the power source voltage and moreover the camera is not in the fictitious shot state.

Also, the device according to the present invention, in order to achieve the above object, is provided with a photometering circuit for generating a photometering signal the amount of which is variable in conformity with the brightness of the object to be photographed, a circuit for generating a photographing information signal outside a predetermined signal level range in response to photographing information, a control circuit for producing the unchanged photometering signal when the photometering signal is within said predetermined signal level range in a case where a display relating to the brightness of the object to be photographed has been selected and clamping the photometering signal within said predetermined signal level range and putting it out when the photometering signal is outside said range, and for putting out a photographing information signal in a case where a display relating to photographing information has been selected, and display means having a display area including a plurality of display positions and displaying a display position corresponding to the signal amount of the output of the control circuit within said area.

DESCRIPTION OF THE PREFERRED EMBODIMENT

Figure 1:
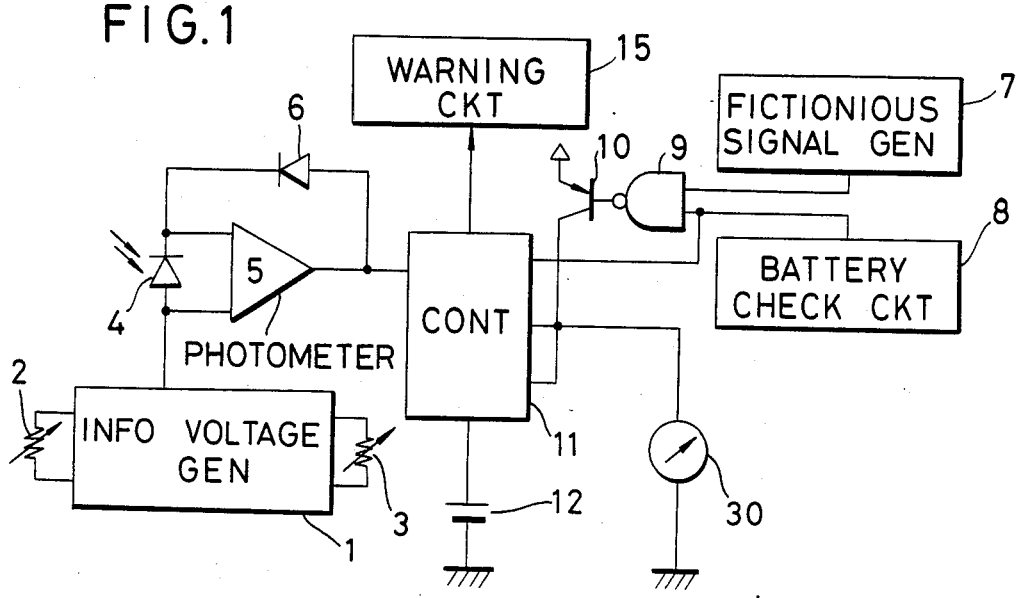
FIG. 1 shows a display device of a camera according to an embodiment of the present invention.

An embodiment of the present invention will hereinafter be described by reference to the drawings. FIG. 1 shows the photographing information display device of an aperture priority automatic exposure control camera according to the embodiment of the present invention. An information voltage generating circuit 1 is provided with a variable resistor 2 whose resistance value is variable in accordance with the film speed and a variable resistor 3 whose resistance value is variable in accordance with the aperture value, and generates an output corresponding to the film speed and the aperture value. A photometering circuit 5 receives the output signal of the information voltage generating circuit 1 as an input, is provided with a light-receiving element 4 for metering the brightness of an object to be photographed and a logarithmic compression diode 6, and puts out, as a photometering signal, an exposure information signal for providing proper exposure to the object to be photographed. Since the present embodiment is of the aperture priority exposure control type, the photometering circuit 5 puts out, as a photometering signal, a signal corresponding to a shutter time for providing proper exposure. A battery check circuit 8 is comprised of a reference voltage setter and a comparator to produce a low level (hereinafter referred to as L level) output when the voltage of a power source, not shown, is reduced below a predetermined voltage for operating the camera normally. A fictitious shot signal generating circuit 7 produces a high level (hereinafter referred to as H level) output during the fictitious shot state. The battery check circuit 8 and the fictitious shot signal generating circuit 7 together constitute a circuit for generating a photographing information signal. The fictitious shot signal generating circuit 7 is operatively associated with a counter, not shown, which in turn is operatively associated with the wind-up of a film. During the fictititous shot, a shutter, not shown, operates at a shutter speed of 1/90 sec. tuned with a strobo. A NAND gate 9 produces an L level output when both of the outputs of the circuits 7 and 8 are at H level, thus rendering a transistor 10 conductive. A control circuit 11 is connected to a reference voltage source 12. A warning circuit 15 warns in accordance with the control circuit 11 when the brightness of the object to be photographed exceeds an exposure-controllable range.

The control circuit 11 has its operation controlled by the output of the battery check circuit 8. When the output of the battery check circuit 8 is at an H level, the control circuit 11 becomes operative, and when the output of the circuit 8 is at an L level, the control circuit 11 becomes inoperative. The control circuit 11 produces an output corresponding to the photometering signal of the photometering circuit 5 to a certain degree of level. However, the upper limit of the output of the control circuit 11 is limited by the voltage of the reference voltage source 12.

Figure 2:
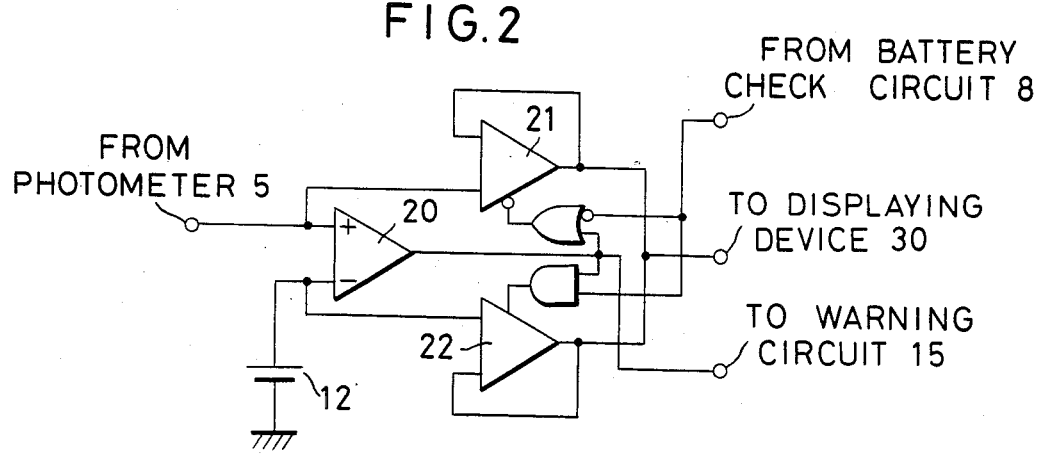
FIG. 2 shows a specific example of the construction of the voltage follower of FIG. 1.

The control circuit 11 will now be described in detail. Reference is had to FIG. 2. The control circuit 11 is further comprised of a comparator 20 and voltage followers 21 and 22. The photometering signal of the photometering circuit 5 is first input to the non-inverting input terminal of the comparator 20 and is compared with the reference voltage level of the reference voltage source 12. When the photometering signal is below the reference voltage level, the comparator 20 produces an L level output and operates the voltage follower 21 and renders the voltage follower 22 inoperative. Accordingly, the output signal of the voltage follower 21 conforming to the photometering signal is put out as the output of the control circuit. On the other hand, when the photometering signal is above the reference voltage level, the comparator 20 produces an H level output and operates the voltage follower 22 and the warning circuit 15 and renders the voltage follower 21 inoperative. Accordingly, by the voltage follower 22, a predetermined level of output conforming to the reference voltage is put out as the output of the control circuit, and the warning circuit 15 displays by a sound or the light emission of LED that the brightness of the object to be photographed has exceeded the exposure control range. Thus, the control circuit 11 no longer produces an output above the voltage corresponding to the reference voltage, but clamps and puts out the photometering signal. On the other hand, when the transistor 10 has become conductive, the control circuit 11 puts out an output of high voltage provided through this transistor 10. In the present embodiment, this output of high voltage provided to the control circuit through the transistor 10 is preset so as to be an output of a level whereby the display device 30 is driven to show the display position outside the area for the exposure display thereof. At this time, provision may be made of a mechanical limitation for setting the signal of high voltage to a remarkably high voltage and clamping the pointer of the display device 30 at the display position outside the area for the exposure display thereof when the display device 30 has been driven by the signal of high voltage.

Figure 3:
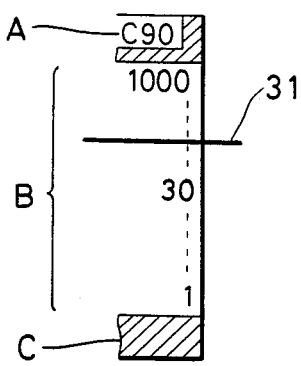
FIG. 3 shows the display state of the display device shown in FIG. 1.

FIG. 3 shows the display condition of the display device 30. A pointer 31 indicates the indication of the display device 30. The display position A is a display position for displaying a fictitious shot, and the display position B includes a plurality of display positions for exposure information such as shutter time. The display position C is a position which is pointed to by the pointer 31 when no electric power is supplied to the display device 30.

Operation will now be described. A film is first loaded into the camera, and then winding-up of the film to the predetermined number of frames by fictitious shot is started. When the power source voltage is above the level for operating the camera normally, the fictitious signal generating circuit 7 generates an H level signal and the battery check circuit 8 also generates an H level signal and therefore, the NAND gate 9 produces an L level output and renders the transistor 10 conductive, and a high voltage is provided to the control circuit and the display device 30 through this transistor 10. The indication of the display device 30 indicates the display position A in accordance with that voltage. On the other hand, when in the fictitious shot state, the power source voltage is below the level for operating the camera normally, the output of the battery check circuit 8 assumes an L level, whereby the operation of the control circuit 11 is inhibited and the display device 30 becomes inoperative, and the pointer 31 points to the display position C. Then, the fictitious shot signal generating signal 7 puts out an L level output after the winding-up of the number of fictitious shot frames has been terminated, and therefore the NAND gate 9 puts out an H level output and the transistor 10 remains non-conductive. Accordingly, the display device 30 effects a display corresponding to the amount of signal put out by the control circuit 11 in accordance with the photometering signal. The amount of signal has its upper limit clamped by the reference voltage as previously described and therefore, the indication of the display device 30 is limited within the area B. Accordingly, this is distinguished from the display position A during the fictitious shot, and the display during the fictitious shot state and the exposure information display can be discriminated from each other.

In the present embodiment, the control circuit for driving the display device is shown as an example of the control circuit which clamps the photometering signal within a predetermined level range and puts it out when the photometering signal is outside the predetermined level range, but such control can also be achieved by endowing the photometering circuit 5 itself with a limitation characteristic for a predetermined level of reference voltage.

Also, in the present embodiment, recognition of particular information is electrically effected and the system for clamping the photometering output in the case of the other state is electrically accomplished, but this may be replaced with a mechanical mechanism.

For example, upon termination of the fictitious shot in response to the winding-up of the film, a limiting member may be mechanically inserted between the area A and the area B of the display device 30.

Further, by setting a warning display position for indicating that the photometering circuit is outside the control range, that is, over-exposure or under-exposure, between the display position for particular photographing information and the display area for the photometering signal, the discrimination between the two types of information can also be more clarified.

Among the recent cameras, there are known ones in which, in the case of the aperture priority exposure control type as shown in the present embodiment, a warning output is produced when the shutter speed put out by the photometering circuit which should be proper exceeds its controllable range or when there may arise hand vibration. Such warning output is obtained by comparing the output of the photometering circuit with a certain reference voltage, but the circuit construction can be simplified by using a common voltage as both this reference voltage for determination and the reference voltage for clamping the photometering output according to the present embodiment. Also, in cameras having the manual control also as the exposure control system, it is possible to obtain these reference voltages from voltage generating means for manual shutter time.

I claim:
1. A camera having means for measuring the brightness of an object to be photographed and generating a measurement signal corresponding to said measured brightness of the object to be photographed, and means for generating a photographing information signal corresponding to photographing information different from said brightness of the object to be photographed, said camera including:
  (a) display means;
  (b) means for inputting said measurement signal to said display means, said display means effecting a display in accordance with said measurement signal;
  (c) said inputting means including changeover means responsive to the generation of said photographing information signal to input said photographing information signal instead of said measurement signal to said display means; and (d) means for clamping the display of said display means within a predetermined range in accordance with the stoppage of the generation of said photographing information signal.

2. A camera according to claim 1, wherein said clamp means includes means for detecting that the level of said measurement signal is outside a predetermined range.

3. A camera according to claim 2, wherein said detecting means includes comparison means for comparing the level of said measurement signal with a predetermined level and generating an output signal when the level of said measurement signal exceeds said predetermined level.

4. A camera according to claim 3, wherein said clamp means includes means responsive to said output signal from said comparison means to put out a signal of said predetermined level to said display means.

5. A camera according to claim 3, further including means for indicating that said output signal has been generated from said comparison means.

6. A camera having means for measuring the brightness of an object to be photographed and generating a photometering signal, and means for detecting that a power source voltage lowers from a predetermined level and generating a voltage detection signal, and wherein by a film loaded into said camera being wound up by a plurality of frames, the preparation for exposing said film to the image of the object to be photographed is made, said camera including:

(a) means for generating a wind-up detection signal until said film is wound up by said plurality of frames;

(b) display means; and (c) means for controlling said display means on the basis of said photometering signal, said voltage detection signal and said wind-up detection signal, said controlling means generating a first display signal in response to said voltage detection signal, generating a second display signal in response to said wind-up detection signal when said voltage detection signal is not generated, and generating a third display signal in response to said photometering signal when said voltage detection signal and said wind-up detection signal are not generated;

(d) said display means including means responsive to said first display signal to indicate a first area, responsive to said second display signal to indicate a second area which does not overlap said first area, and responsive to said third display signal to indicate a third area which does not overlap said first and second areas.

* * * * *